(No Model.)
G. W. BLAIR & J. WILLETTS.
GLASS MELTING FURNACE.
No. 283,462. Patented Aug. 21, 1883.
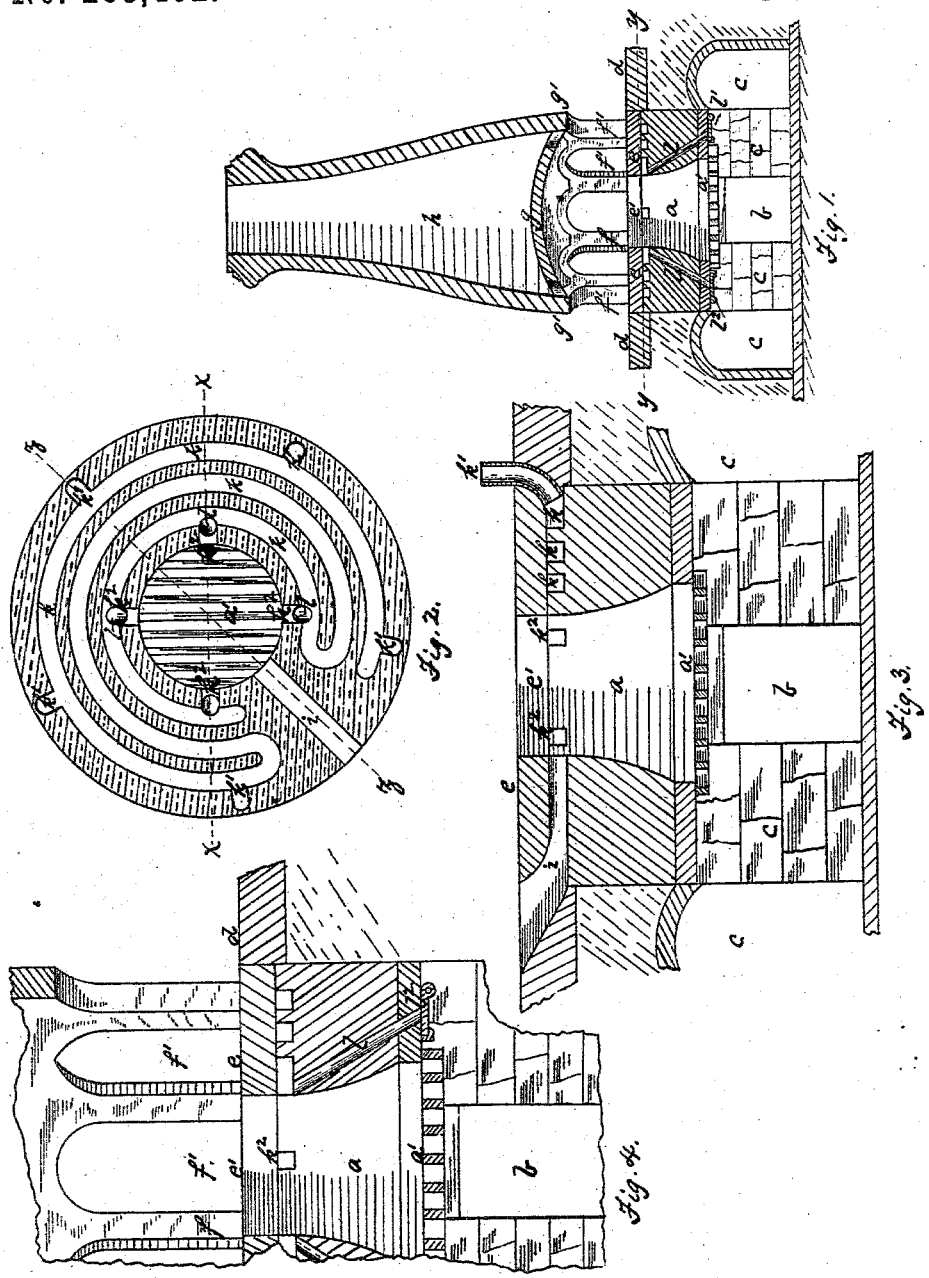
Witnesses_
W. B. Corwin
Jno. K. Smith
Inventors
George W. Blair
Jesse Willetts
by their attys
Bakewell & Kerr

UNITED STATES PATENT OFFICE.

GEORGE W. BLAIR AND JESSE WILLETTS, OF PITTSBURG, PENNSYLVANIA.

GLASS-MELTING FURNACE.

SPECIFICATION forming part of Letters Patent No. 283,462, dated August 21, 1883.

Application filed May 28, 1883. (No model.)

*To all whom it may concern:*

Be it known that we, GEORGE W. BLAIR and JESSE WILLETTS, both of Pittsburg, in the county of Allegheny and State of Pennsylvania, have invented a new and useful Improvement in Glass-Melting Furnaces; and we do hereby declare the following to be a full, clear, and exact description thereof.

Our invention relates to the construction of that class of glass-melting furnaces wherein air is supplied to the gases and products of combustion in the eye of the furnace in order to induce complete combustion and prevent the formation of those irregular tongues of flame which have a tendency to cut and destroy the pots.

To this end it consists, mainly, in the arrangement within the bench of an air-heating flue or flues disposed in concentric coils, (or manifolds,) whereby the length of the heating-flue is greatly increased, and the air can be raised to a much higher temperature than by flues as now arranged, and whereby the overlying bench is more thoroughly protected.

It further consists in the combination, with the air-heating flues, of cleaning-flues, discharging into the galleries or at other suitable points, whereby the clogging of the air-flues may be prevented, all as will hereinafter more fully appear.

To enable others skilled in the art to make and use our improved furnace, we will now describe it by reference to the accompanying drawings, in which—

Figure 1 is a vertical section on the line $xx$ of Fig. 2. Fig. 2 is a horizontal section on the line $yy$ of Fig. 1. Fig. 3 is a vertical section on the line $zz$ of Fig. 2. Fig. 4 is an enlarged view of a portion of Fig. 1.

Like letters of reference indicate like parts in each.

The furnace is provided with a fire-chamber, $a$, having grate-bars $a'$, ash-pit $b$, galleries $c$, floor $d$, bench $e$, eye $e'$, pot-chamber $f$, work-holes $f'$, arch $g$, arch-flues $g'$, stack $h$, and stoke or fuel-feeding hole $i$, all of the usual or known construction. A furnace so made is open to all the objections hereinbefore mentioned, to obviate which is the object of our improvement.

Under the bench $e$ we make a series of air-flues, $k$, which circulate, as shown in Fig. 2, by concentric coils, and are provided with air-openings $k'$, entering through the surface of the bench or floor. The air thus supplied passes through the flues $k$ and enters the eye below the bench by means of distributing-ports $k^2$.

Extending down from the ports $k^2$ to the galleries $c$ are cleaning-holes $l$, which, at their lower ends, are closed by means of doors $l'$. The air, in passing through the flues $k$, is heated to any desired degree, that depending upon the length of the run through the flues, and enters the eye below the bench in a heated condition. At this point it meets the gases arising from the fire-chamber $a$, where they have been generated by the combustion of the fuel upon the grate-bars $a'$, and, commingling therewith, causes the gases to burn uniformly and with intense heat. The length of run of the air-flues $k$ should be sufficient to heat the air to such a degree that it will not condense the gases and produce smoke. The effect of the injection of the hot air at a number of points around the eye into the volume of ascending gases is to cause them to burn uniformly, and to check all tendency to the darting of the flames and unequal combustion, so objectionable in the old form of furnace. The air-flues $k$ have also the effect of protecting the bench and eye of the furnace from burning out, and of producing a nearly complete combustion of all gases evolved in the fire-chamber, thus obtaining great economy in operation and obviating the necessity for frequent repairs.

This construction enables us to retain the form and arrangement of the old melting-furnace, which is very desirable, and which is extremely cheap as compared with the furnace now in use having separate gas-producers.

We find by experience that it is much better to place the grate-bars considerably lower than in the old form of furnace, so as to give a greater distance for the rise of the gases from the fuel on the bars, in order to raise their temperature and to cause them to be more perfectly mixed with the heated air. This construction gives an unusually deep fire-chamber.

One of the principal advantages of our improvement consists in the saving it effects in reducing the wear of the pots.

What we claim as our invention, and desire to secure by Letters Patent, is—

1. A glass-melting furnace having air-heating flues arranged in concentric coils or manifolds immediately below the bench, said flues provided with ports which deliver into the eye of the furnace at or below the level of the bench, substantially as and for the purpose specified.

2. A glass-melting furnace having a fire-chamber directly below the eye, and air-heating flues extending through the walls under the bench and discharging into the eye at or below the level of the bench, in combination with cleaning-holes commanding the exit-ports of the air-flues, substantially as and for the purposes described.

In testimony whereof we have hereunto set our hands this 24th day of May, A. D. 1883.

GEORGE W. BLAIR.
   JESSE WILLETTS.

Witnesses:
 W. B. CORWIN,
 T. B. KERR.